(12) United States Patent  (10) Patent No.: US 7,986,760 B2
Johnson  (45) Date of Patent: Jul. 26, 2011

(54) METHOD AND APPARATUS FOR PERMISSIVE CONTROL OF A MAST AND GRAPPLE

(75) Inventor: Michael Johnson, Collegeville, PA (US)

(73) Assignee: GE-Hitachi Nuclear Emergy Americas, LLC DE (US)

( * ) Notice: Subject to any disclaimer, the term of this patent is extended or adjusted under 35 U.S.C. 154(b) by 40 days.

(21) Appl. No.: 11/984,276

(22) Filed: Nov. 15, 2007

(65) Prior Publication Data

US 2009/0129528 A1   May 21, 2009

(51) Int. Cl.
 *G21C 19/00* (2006.01)
(52) U.S. Cl. ......... 376/262; 376/264; 376/267; 376/268
(58) Field of Classification Search ............... 376/267, 376/268, 264, 262
See application file for complete search history.

(56) References Cited

U.S. PATENT DOCUMENTS

| | | | | |
|---|---|---|---|---|
| 4,427,623 A | * | 1/1984 | Howard et al. | 376/263 |
| 4,666,200 A | * | 5/1987 | Walker et al. | 294/110.2 |
| 4,713,212 A | * | 12/1987 | Plumier | 376/258 |
| 5,113,179 A | * | 5/1992 | Scott-Jackson et al. | 345/161 |
| 5,369,676 A | * | 11/1994 | Ortega et al. | 376/271 |
| 5,644,607 A | | 7/1997 | Iwama et al. | |

FOREIGN PATENT DOCUMENTS

JP   8-262182   10/1996

OTHER PUBLICATIONS

European Search Report dated Apr. 18, 2011, issued in U.S. Appl. No. 08/168,545.

* cited by examiner

*Primary Examiner* — Rick Palabrica
*Assistant Examiner* — Erin M Leach
(74) *Attorney, Agent, or Firm* — Harness, Dickey & Pierce, P.L.C.

(57) ABSTRACT

A method and apparatus for the permissive control of a mast and fuel grapple to be used in the movement of reactor fuel components, including fuel assemblies, single blade and double blade guides, to be used in a Boiling Water Reactor (BWR) nuclear reactor. The Permissive Control System reduces the chance of human error associated with the movement of reactor components by assisting in controlling the location (plant coordinate) of the mast for picking-up and dropping-off reactor components, the sequence of reactor component movements, the orientation (angular rotation) of the mast and fuel grapple, the raising and lowering of the grapple, and the opening and closing of the fuel grapple.

8 Claims, 8 Drawing Sheets

METHOD AND APPARATUS FOR PERMISSIVE CONTROL OF A MAST AND GRAPPLE

BACKGROUND OF THE INVENTION

1. Field of the Invention

Example embodiments relate in general to a method and apparatus for control of the three-dimensional movement of a mast. More specifically, example embodiments relate to control of the movement of nuclear reactor components, in terms of ensuring that their two-dimensional location (i.e., plant coordinate), their elevation, and their orientation (i.e., angle of rotation) correspond to a reactor engineer's instructions. Example embodiments further relate to a control permissive that allows reactor components to be picked-up and dropped-off in plant coordinates and orientations that match a reactor engineer move sheet during nuclear reactor refueling or initial start-up.

2. Related Art

In a Boiling Water Reactor (BWR) the orientation of reactor components such as fuel assemblies and blade guides (single or double blade) is important for various reasons. During operation of the reactor the fuel assemblies must be oriented for proper physics of the core. During maintenance and examination, single and double blade guides may be oriented to keep control rods in a vertical position while providing access for inspection.

Fuel assemblies and single blade guides may have four possible orientations (each at and angle of rotation of 90° increments) when they are lowered into the core or spent fuel pool. In addition to the orientation of the fuel assembly, another important consideration may be the location of the channel fastener. Fuel assemblies may be located in a quadrant of a fuel cell, and the fasteners must face the center of the cell. The single blade guide also has an orientation consideration, as buttons on the side of the blade must face the control rods in order for the blade to effectively hold the rods in a vertical position following placement of the blade into a cell. A double blade guide can be loaded in only two directions, depending on the maintenance or examination being conducted in the core.

Mis-orientation of reactor components may be a potentially time-consuming and expensive problem in the operation of nuclear reactors. Most US nuclear plants classify a fuel assembly in the wrong orientation as a fuel handling error, if the wrong orientation is in the core. A fuel handling error could cost a utility $1.5M on critical path time. Conventionally, the responsibility of fuel assembly orientation has been on human operators called the fuel mover and the spotter positioned on a refueling platform, to ensure that reactor components are relocated and oriented according to plant move sheets. Even with a second or third verifier, reactor components may be installed in the wrong orientation, leading to plant downtime or even serious reactor malfunction, potential accidents, and potential Nuclear Regulatory Commission (NRC) fines and investigation.

SUMMARY OF INVENTION

A boiling water reactor requires movement of reactor components (fuel assemblies and single/double blade guides) during plant refueling and plant initial start-up. The movement of these components occurs between the reactor core and spent fuel pool. Conventionally, during plant refueling ⅓ of the fuel assemblies may be substituted with new fuel assemblies while another ⅔ of assemblies may be repositioned within the reactor core. During initial plant startup, the entire reactor core is filled with fuel assemblies. In either a refueling or initial startup scenario, a significant movement of reactor components may occur as fuel assemblies and blade guides are picked-up and dropped-off while traveling through a flooded "cattle chute" that may connect the reactor core and the spent fuel pool. The Permissive Control System assists in preventing the physical extraction or insertion of reactor components if the mast and grapple are not in the correct location or orientation, and the Permissive Control System may provide an error message to a user or operator, as opposed to relying on human verification to identify misplaced or mis-oriented components.

A telescoping mast with a grapple on the end is provided to move the reactor components and rotate them into the proper orientation. Example embodiments include a mast orientation apparatus, which uses proximity switches to monitor the position (in 90° increments, or four specific "orientations") of the grapple. Within the nuclear reactor industry in the U.S., these four orientations may be sometimes referred to as orientations 1, 2, 3 and 4 (foreign plants may refer to them as 0, 1, 2 and 3). Alternatively, the orientations may be referred to as easy left, hard left, easy right, and hard right. The Permissive Control System provides a mast orientation signal, indicating which "orientation" (1, 2, 3 or 4) the mast and grapple are in, that may be relayed back to a PLC (programmable logic controller) cabinet. Other inputs to the PLC may include the plant coordinates (x-axis and y-axis location) of the mast. The PLC may then provide grapple orientation and mast location to an industrial computer, personal computer (PC), operator touch-screen or other such user interface, described generically as a "computer" throughout the remainder of the specification. Alternatively, the orientation and location information may bypass the PLC and go directly to the computer. The computer may provide user interface information, including orientation and location, to a user that may be located for instance on a refueling platform. The PLC and or computer may provide user input related to the movement of reactor components. Such input may be entered piecemeal, in a pseudo-manual or semi-automatic mode, or alternatively input data related to component movement (pick-up and drop-off locations and orientations of components, and the sequence of component movements) may be pre-programmed such that the computer/PLC can operate in more of an automatic mode.

The computer may provide a user interface related to reactor component movement, which may then be relayed to a PLC that in turn controls mast movement, in x-axis and y-axis locations throughout the plant. The PLC may also control the z-axis movement of the grapple by controlling the telescoping nature of the mast. The PLC examines the orientation (rotation) of the grapple and mast, and may then prohibit the z-axis movement of the mast into the reactor core or the spent fuel pool.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
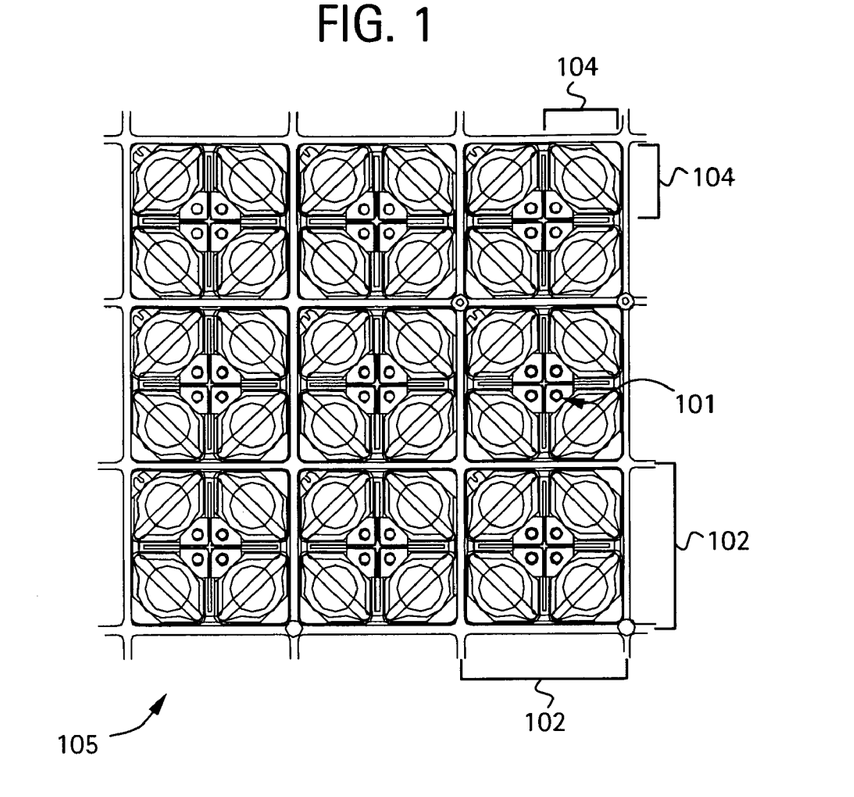
FIG. 1 is a overhead view of fuel cells located in a nuclear reactor core.

Referring to FIG. 1, a nuclear reactor core 105 may be composed of individual fuel assemblies or bundles 104 located in a single quadrant of a fuel cell 102. Fuel cells 102 are generally square in shape, and contribute to an overall matrix-like appearance of the core 105. Fuel cells are replaced, during a plant refueling outage, by first removing each of the four fuel assemblies of a fuel cell, as depicted in FIGS. 1 through 6.

Figure 2:
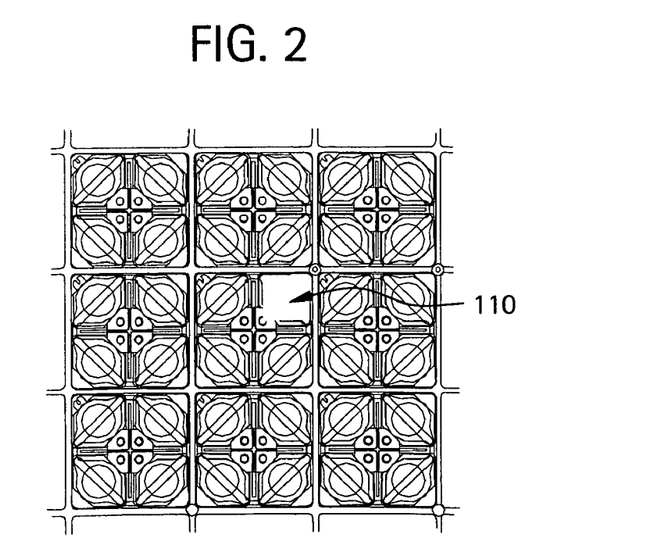
FIG. 2 is an overhead view of fuel cells, with a single fuel assembly removed from one of the fuel cells.

Referring to FIG. 2, during a typical plant refueling outage, one of fuel assemblies 104 is removed, leaving a temporarily vacant fuel cell quadrant 110.

Figure 3:
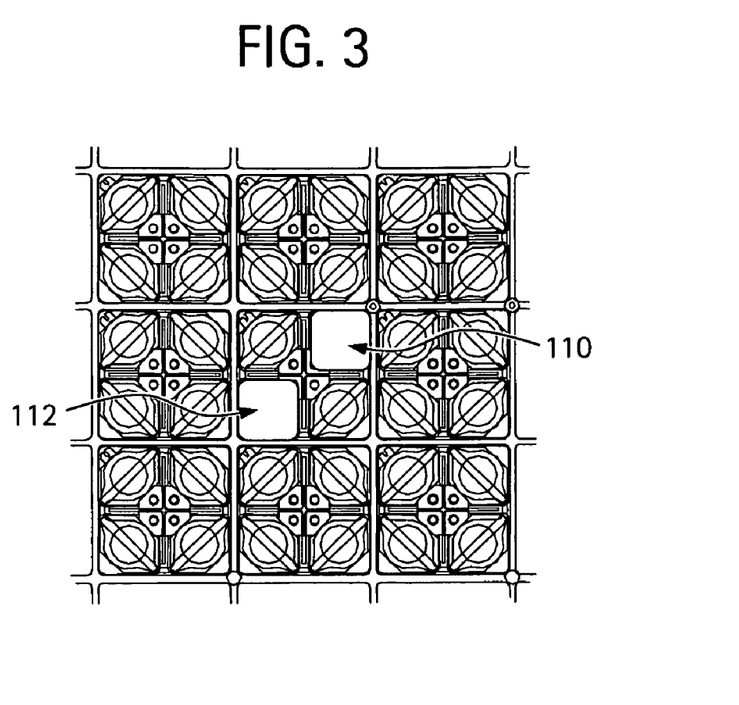
FIG. 3 is an overhead view of fuel cells, with two fuel assemblies (positioned diagonally from each other) removed from one of the fuel cells.

Referring to FIG. 3, it is common practice to remove and then replace entire fuel cells by first removing a fuel assembly 104 from a fuel cell quadrant 110, and then removing the diagonally opposing fuel assembly 104, leaving a diagonally opposing vacant fuel cell quadrant 112.

Figure 4:
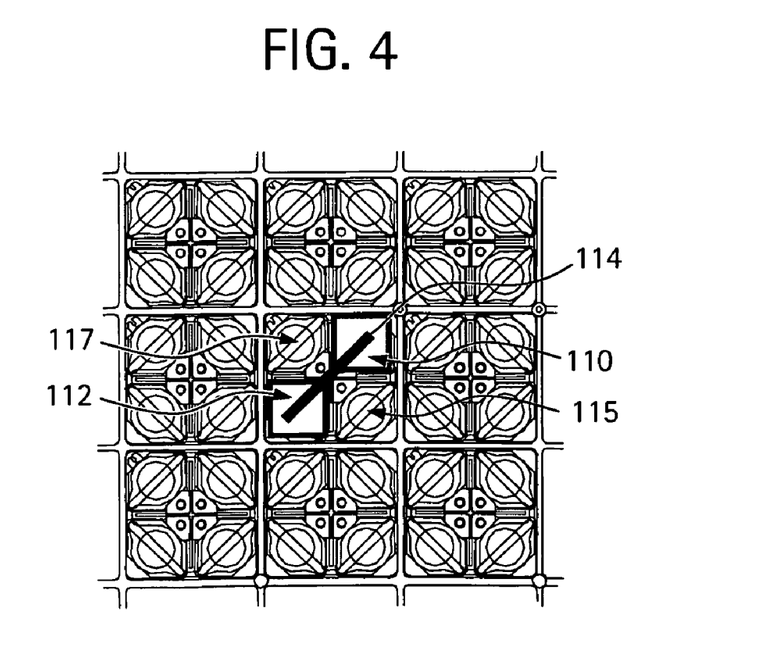
FIG. 4 is an overhead view of fuel cells, with a double blade guide placed in the empty positions of two fuel assemblies that have been removed from a fuel cell.

Referring to FIG. 4, a double blade guide 114 may then be placed in the diagonally opposing vacant areas 110 and 112 of the fuel cell, in order to ensure that the remaining fuel assemblies 104 in fuel cell quadrants 115 and 117 located near the vacant quadrants 110 and 112, are supported, such that they stay in a vertical position.

Figure 5:
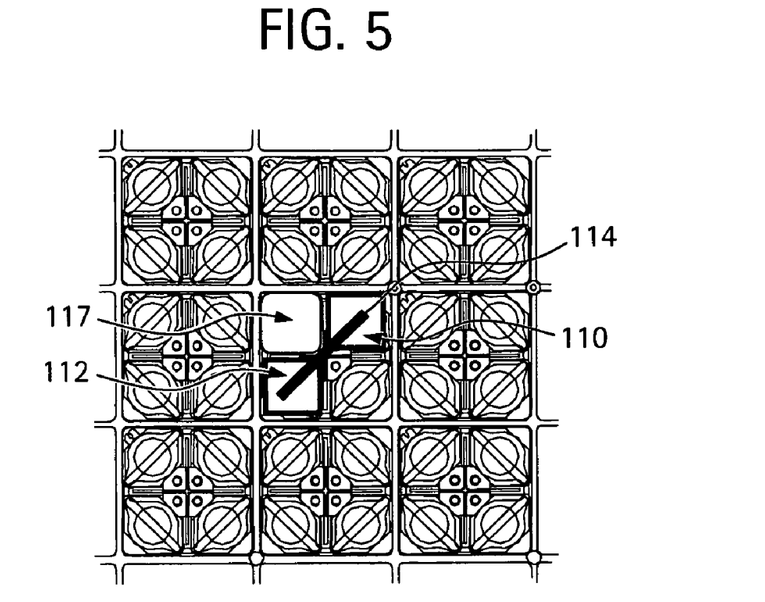
FIG. 5 is an overhead view of fuel cells, with a double blade guide placed in the empty positions of two fuel assemblies of a fuel cell, and a third fuel assembly removed from the fuel cell.

Referring to FIG. 5, another fuel assembly 104 may be removed leaving another vacant quadrant 117 of the fuel cell 102.

Figure 6:
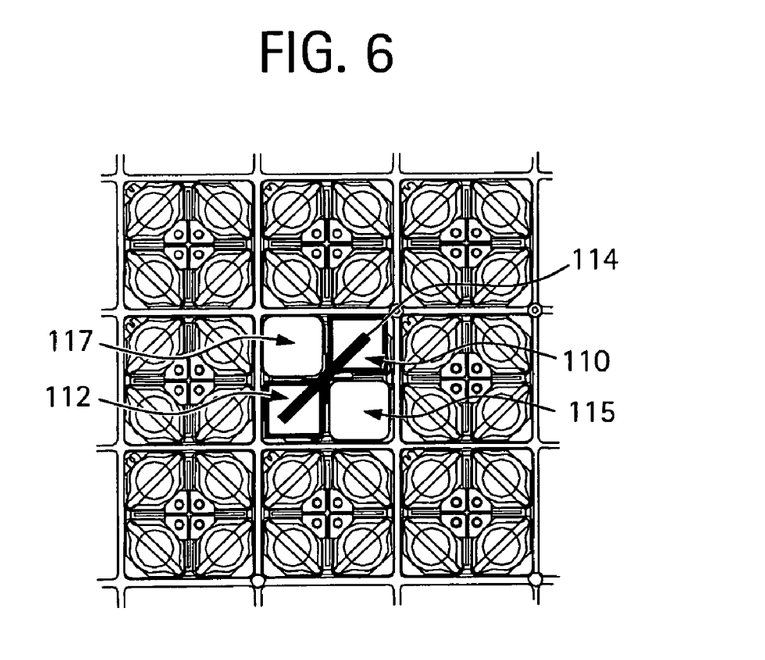
FIG. 6 is an overhead view of all four fuel assemblies being removed from a fuel cell, with a double blade guide positioned in the empty positions of two diagonally opposed fuel assemblies.

Referring to FIG. 6, the final fuel assembly 104 of the fuel cell 102 may be removed leaving the vacant quadrant 115. The fuel cell 102 with all empty quadrants, quadrant 110, 112, 115 and 117, is now be ready for inspection and or later refueling (by placing new fuel assemblies 104 in the fuel cell 102, or moving partially used fuel assemblies from other areas of the core to the fuel cell 102).

Figure 7:
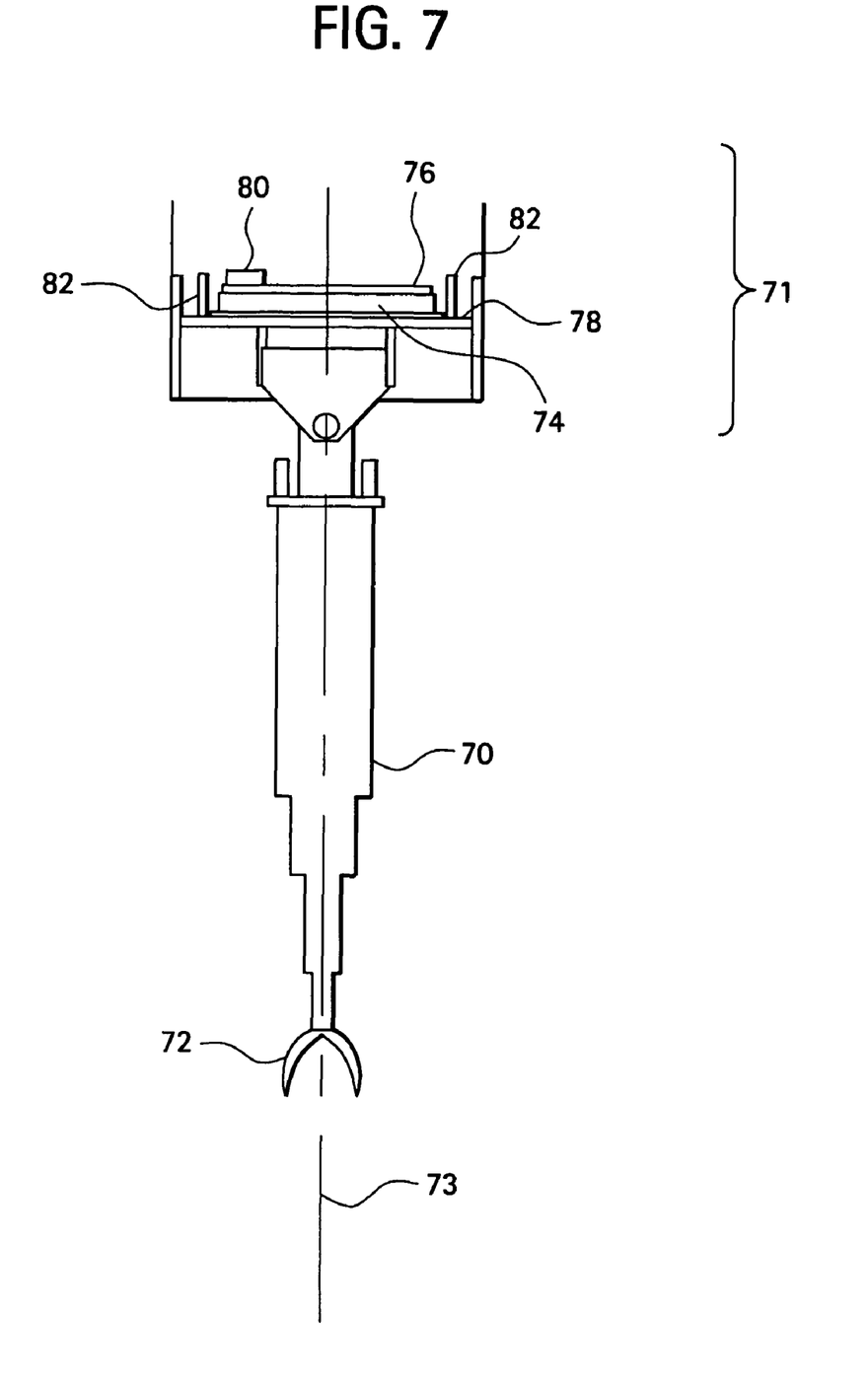
FIG. 7 is an elevation view of a conventional telescoping mast and grapple, with a mast orientation apparatus added to the top of the mast.

Referring to FIG. 7, a conventional telescoping mast 70 and fuel grapple 72 may be outfitted with a mast orientation apparatus 71, according to an embodiment of the present invention. While not shown, the conventional mast and grapple generally includes a motor-driven bridge (for x-axis movement of the mast) and trolley (for y-axis movement), manually operated mast rotation, a motor-driven hoisting cable for elevation changes (z-axis movement) of the mast, pneumatically controlled opening and closing of the fuel grapple, a controller that may be programmed to position the mast (via the bridge and trolley) at specific plant coordinates, and a display screen or graphical user interface to notify the user of the location (coordinate) and elevation of the mast and the open/closed position of the grapple. The mast orientation apparatus 71 may monitor and indicate the orientation (angle of rotation) of the mast and grapple, as it is being manually rotated in a conventional manner. In one embodiment, such orientations may be assigned in 90° increments. For instance, the mast and grapple may be at a position assigned to be 0°, 90°, 180°, or 270°. The motor-driven bridge and trolley and the conventional controller associated with the bridge/trolley may be operated in a conventional manner to position the mast for pick-up or drop-off of components, although example embodiments provide for the controlled movement of the mast in either automatic or semi-automatic mode (shown in FIGS. 10 and 11) with a graphical user interface and PLC (156 and 151, of FIG. 9) displaying the location of the mast and further control component movements. Sensing of the mast and grapple location may be accomplished by conventional means, as the mast and grapple location (plant coordinate) are calibrated, conventionally, based on the location of the bridge and trolley, and this location may be transmitted to a PLC, computer, controller, or other such means of controlling the mast and grapple location as a part of the Permissive Control System. The Permissive Control System may control the motor-driven hoisting via the PLC (151 of FIG. 9), while example embodiments allow a user to view the elevation of the fuel grapple on a graphical user interface (156 of FIG. 9). The Permissive Control System may control the pneumatic opening and closing of the fuel grapple via the PLC (151 of FIG. 9), while example embodiments allow the user to view the open or closed status of the grapple on a graphical user interface (156 of FIG. 9). The Permissive Control System may prohibit a change in the position of the grapple (either from open to closed, or closed to open) unless the mast and grapple are at a requested plant location, elevation and orientation. The conventional display screen or graphical user interface (156 of FIG. 9) may be used with the Permissive Control System, with example embodiments providing the user with information pertaining to the physical location (coordinate) of the mast, the elevation of the fuel grapple, the open or closed status of the fuel grapple and the orientation of the mast.

The mast orientation apparatus 71 may include a trolley mounting plate 78 that supports a gimbal bearing 74. The gimbal bearing 74 supports a gimbal plate 76 that may be allowed to freely rotate on top of the gimbal bearing 74. As the mast 70 and grapple 72 rotate about an axis of rotation 73 in order to adjust orientation, the trolley mounting plate 78 and the gimbal bearing 74 remain approximately stationary, and at least a portion of the gimbal plate 76 rotates with the mast 70 and grapple 72 in order to mirror the grapple 72 orientation. A cam (or, target) 80 may be positioned on top of the gimbal plate 76, such that the cam 80 rotates with the rotation of the gimbal plate 76. Proximity switches 82 may be located on the trolley mounting plate 78, or otherwise located along the periphery of the gimbal plate 76. As the cam 80 rotates on top of the gimbal plate 76, the position of the cam 80 is monitored by the proximity switches 82. Proximity switches 82 may be any type of proximity switch/sensor, limit switch reed switch, or similar type of device that may sense the relative position of the cam 80. The proximity switches 82 may be biased, such that when several proximity switches 82 are used, the switches may accurately recognize which switch 82 the cam 80 is closest to at any given time.

Figure 8:
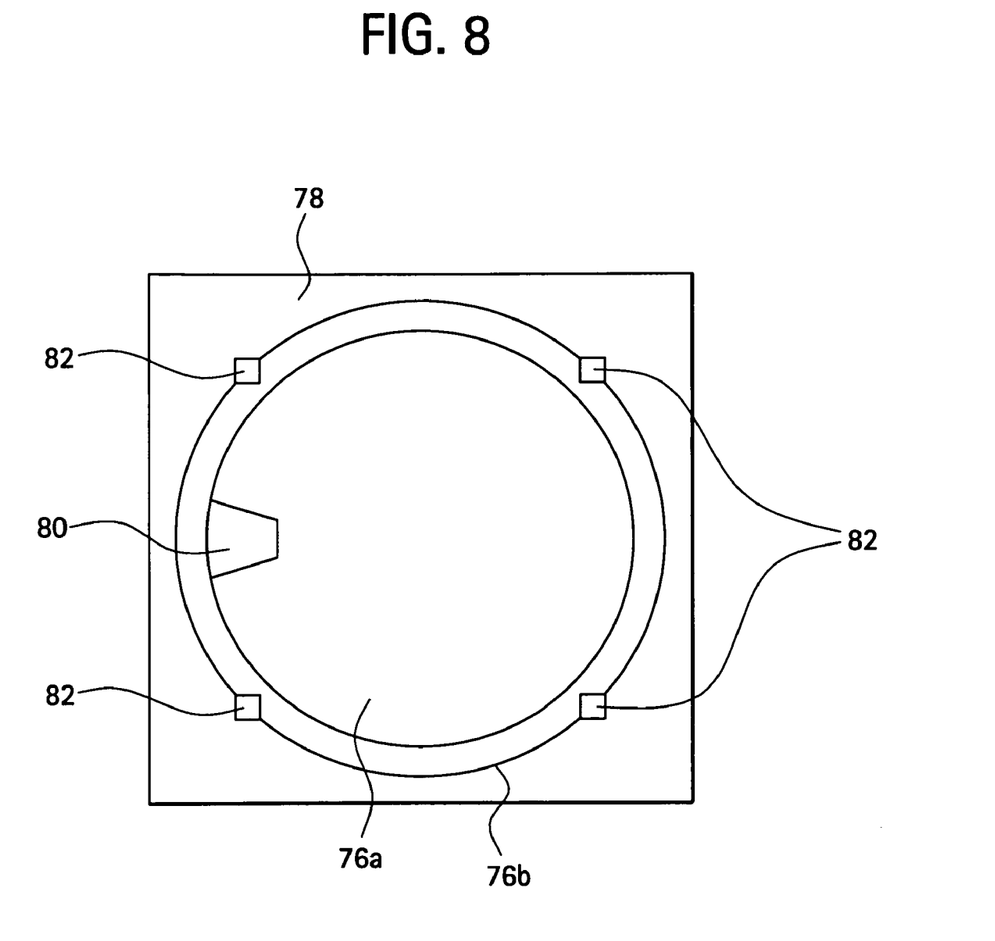
FIG. 8 is an overhead view of the top of the mast orientation apparatus.

Referring to FIG. 8, a top view of the mast orientation apparatus 71 depicts the trolley mounting plate 78 that supports a gimbal plate outer race 76b. The gimbal plate outer race 76b in turn supports a gimbal plate inner race 76a. A cam 80 is affixed to the gimbal plate inner race 76a. The cam 80 and gimbal plate inner race 76a mirror rotation of the mast 70 and grapple 72 (FIG. 7), while the gimbal plate outer race 76b may remain approximately stationary relative to the mast 70 and grapple 72 (FIG. 7) rotation. Proximity switches 82 may be located along the periphery of the gimbal plate outer race 76b, such that the proximity switches 82 may detect the position of the cam 80, as the gimbal plate inner race 76a and cam 80 rotate relative to the trolley mounting plate 78 and gimbal plate outer race 76b.

Figure 9:
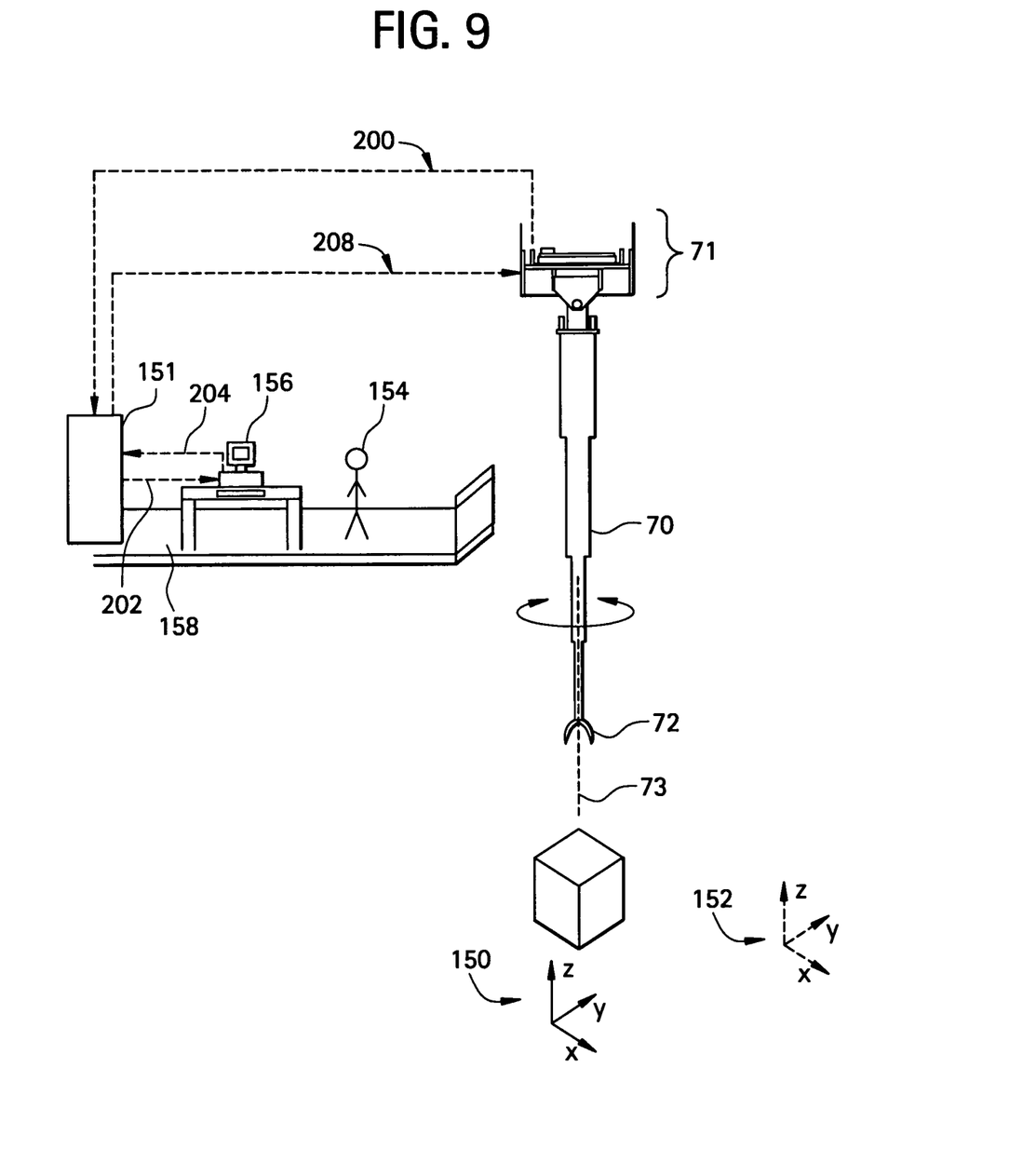
FIG. 9 is a depiction of a telescoping mast and grapple located above a reactor component, and a refueling platform supporting a PLC cabinet and computer user interface.

Referring to FIG. 9, a conventional mast 70 and grapple 72 may be outfitted with a mast orientation apparatus 71. A user 154, such as a core engineer, may view operation of the mast 70 and grapple 72 from a refueling platform 158. The mast orientation apparatus 71 may generate a mast orientation signal 200 that may be transmitted to a PLC (programmable logic controller) cabinet 151, that receives the orientation signal 200 along with the other information such as the physical location of the mast 70 or the elevation of the grapple 72. The PLC 151 may then generate a location/orientation signal 202 to a user interface display such as an industrial computer, touch-screen, or a personal computer (computer) 156. The computer 156 may allow the user 154 to view the location (physical coordinate) of the mast 70, the elevation of the grapple 72 (as the mast 70 telescopes and contracts), and the orientation (angle of rotation) of the grapple 72 as the grapple 72 rotates about an axis of rotation 73. The computer 156 allows the user to enter the pick-up coordinate 150 and drop-off coordinates 152 of reactor components, either prior to or during the movement of reactor components.

The computer 156 may generate a control signal 204 that may be transmitted to the PLC 151, describing the desired movement of the mast 70 and grapple 72. The PLC 151 may then generate a mast control signal 208 that may be transmitted to a motor (not explicitly shown) of the mast 70 and grapple 72, in order to control the x-axis, y-axis, z-axis movement of the mast 70 and the open and closed position of the grapple 72.

Figure 10:
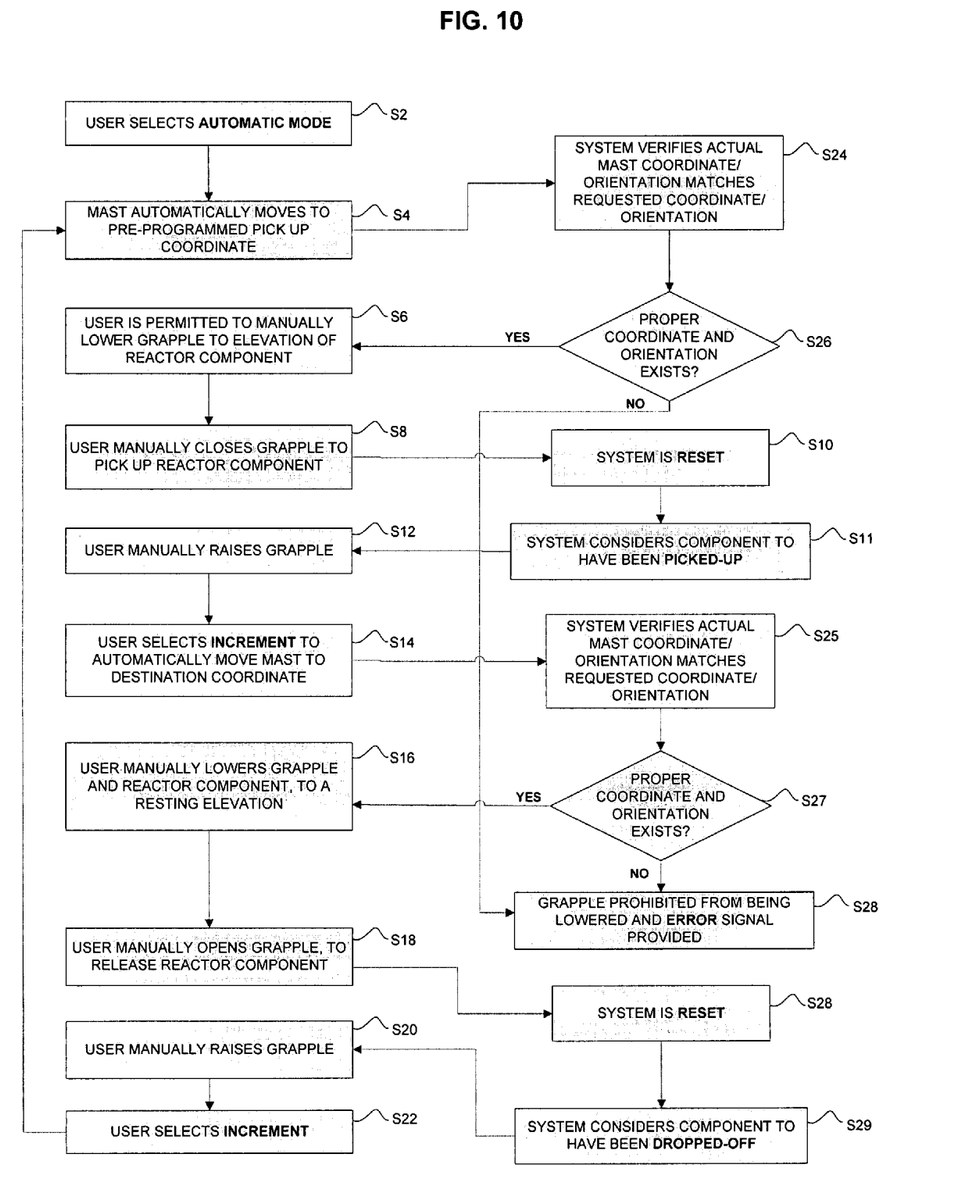
FIG. 10 is a flowchart of an example embodiment of the Permissive Control System computer program, in an automatic mode.

Computer 156 may be programmed, via a computer program, to control the location of the mast and act as a permissive for the opening/closing and elevation of the fuel grapple, in an automatic, semi-automatic, or a manual mode. FIG. 10 provides a description of an example embodiment pertaining to an automatic type mode. Referring to FIG. 10, the mast/grapple may be controlled through the use of the Permissive Control System computer program, by a user manually selecting an AUTOMATIC mode in step S2 on a touch-screen or computer, causing the mast to move to a pre-programmed pick-up coordinate S4. It should be appreciated that in AUTOMATIC mode, the pick-up and drop-off coordinates of all reactor components may already be pre-programmed into a computer 156 or PLC 151 (depicted in FIG. 9) prior to a user selecting AUTOMATIC mode in step S2. The pick-up and drop-off coordinates and component orientations may match a move sheet, conventionally used to describe the movements of reactor components during plant refueling or start-up. It should be appreciated that the pre-programmed pick-up and drop-off information may include the sequencing of these movements, such that a pre-programmed order in which the components may be moved exists.

Once the mast moves into place above a reactor component, but prior to the grapple being allowed to enter a user-programmable elevation (for instance, 6 inches) above the top guide of the core or above the top of the spent fuel rack, the Permissive Control System verifies that the actual mast and grapple coordinate and orientation matches the requested coordinate and orientation in step S24. If the mast/grapple are not in the correct coordinate/orientation, the Permissive Control System prohibits the grapple from being lowered in step S28 and provides an error signal in step S28 to notify the user that the mast/grapple may be out of position. If the mast/grapple are in the proper location/orientation in step S26, the Permissive Control System may permit the user to manually lower the grapple to the elevation of the reactor component in step S6 for pick-up. It should be appreciated that due to the physical constraints of a tightly bundled reactor core or spent fuel pool, the Permissive Control System does not permit rotation of the mast/grapple once the grapple moves below the user-programmable elevation above the top guide of the core or above the top of the spent fuel pool, as a reactor component attached to the grapple could strike or damage surrounding equipment if allowed to rotate during component insertion or extraction. Furthermore, between the point where a component may be picked-up and prior to being dropped-off (i.e., during the time when the grapple may be carrying a component), the Permissive Control System may take into account the length of the component itself, such that the user-programmable elevation above the core or spent fuel pool will then take into consideration that the grapple may be carrying a component, of given length, that may not be allowed to strike or damage equipment that is located below such pre-programmable elevation.

Example embodiments provide the Permissive Control System with a system RESET in step S10, at any instance when: 1) the grapple cable is slack (i.e., the grapple cable may be at rest, as opposed to being taught as in the case where the grapple may be carrying a component or otherwise suspended above a component before or after component pick-up or drop-off), and 2) the grapple hooks change position (i.e., change from open to closed, or closed to open). It should also be noted that the systems permissive control related to any specific step in a pick-up or drop-off sequence (for instance, a permissive control that is not allowing the grapple to be manually raised, because the grapple was never closed during pick-up) may be manually bypassed (i.e., the system is RESET) by either turning off the Permissive Control System. Additionally, example embodiments allow the system to automatically RESET if an ERROR message occurs (this may be the case when the mast is moved to a pick-up or drop-off, but the location or orientation of the mast/grapple does not match a requested location/orientation) or if a MANUAL operation mode is entered.

When the user manually closes the grapple in step S8 in order to pick-up a component, the system then assumes that, in this instance, a component has been picked-up, in step 10. Example embodiments of the Permissive Control System may refer to this as a system RESET, as the system is operating under the assumption that the manual closing of the fuel grapple in step S8 indicates that the grapple is now carrying a component, as indicated in step S11. The system then permits a user to manually raise the grapple in step S12.

A user may automatically move the mast to a pre-programmed destination (drop-off) coordinate by making a manual selection that may be available on a user interface, in step S14. Example embodiments may optionally include a selection labeled "INCREMENT" (shown in step S14) on a user interface that may be manually selected to accomplish such automated movement of the mast. When the mast reaches the drop-off point, the system then verifies that the actual mast/grapple coordinate and orientation match a requested coordinate and orientation in step S25. The system determines whether the mast/grapple is properly located/oriented in step S27, and if they are not, then the grapple may be prohibited from being lowered in step S28 and an error signal may be provided for a user in step S28 in order to signify that the mast and/or grapple are not in a correct location/orientation for component drop-off. If the mast/grapple are correctly located/oriented, then a user may be permitted to manually lower the grapple in step S16 for component drop-off. Once the user has manually lowered the component, the system permits the user to manually open the grapple in step S18, to complete component drop-off. Once the grapple is manually opened, the system may automatically RESET in step S28, as the system considers the component to have been dropped-off in step S29. The user may be then permitted to manually raise the grapple in step S20. The user may select INCREMENT in step S22, and the mast may be then automatically relocated to the next pre-programmed location S4, in order to pick-up the next component in the pre-programmed sequence of reactor component movements.

It should be appreciated that one of the benefits of AUTOMATIC mode may be the preprogrammed nature of the reactor component locations and the sequence of component movements. However, due to the sheer magnitude of components needing to be moved during plant refueling or startup, it may be inevitable that such a sequence of component movements may become more quickly accomplished by partially deviating from the exact sequence initially programmed into the computer or PLC at the outset of component movements. Therefore, the Permissive Control System may be capable of allowing components to be picked up and dropped-off in an order that differs from the originally planned reactor engineer move sheet, while still ensuring that each individual component may be picked-up and dropped-off in the proper location/orientation.

Figure 11:
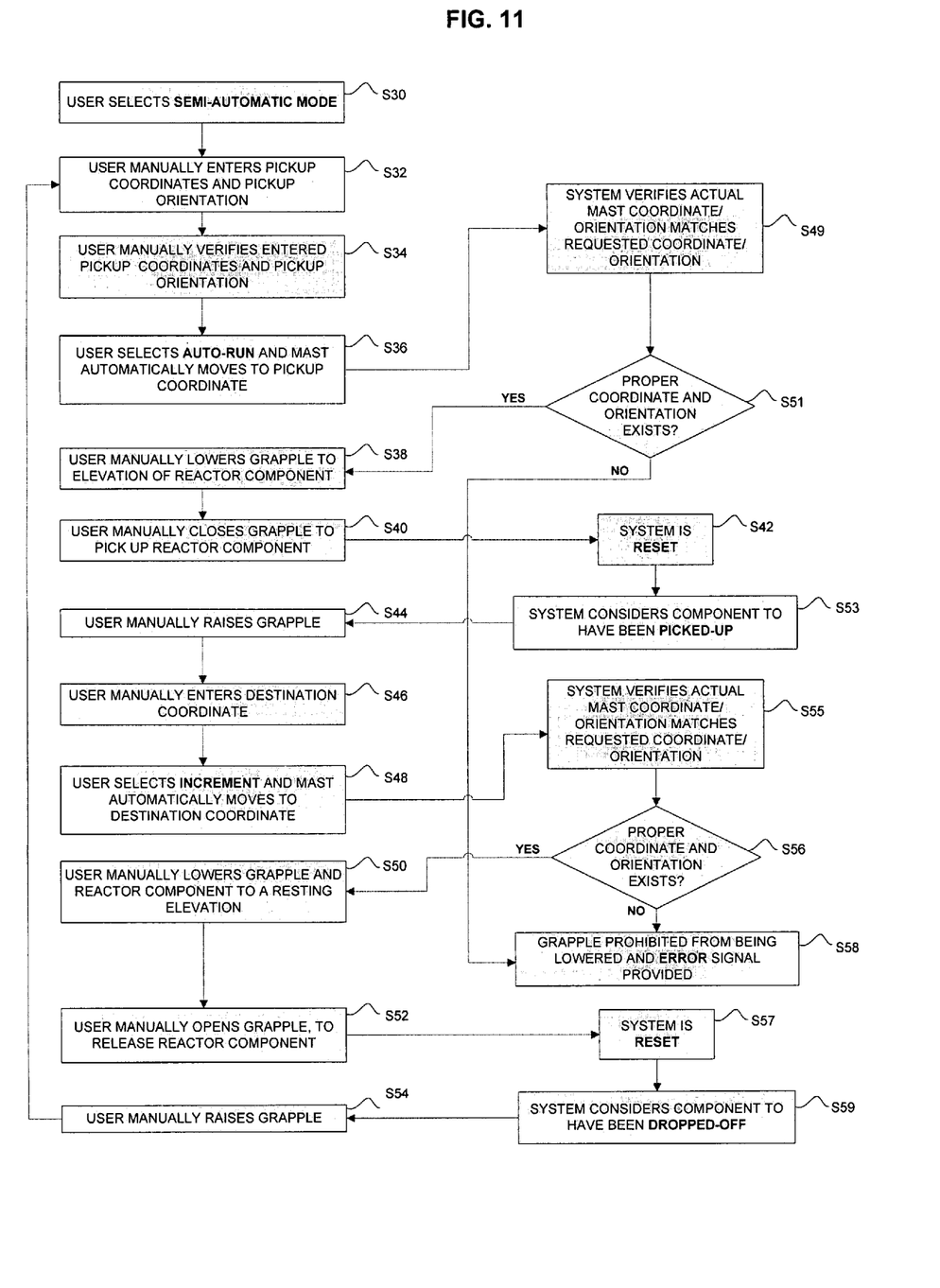
FIG. 11 is a flowchart of an example embodiment in a semiautomatic mode.

FIG. 11 provides a description of an example embodiment pertaining to a semi-automatic or pseudo-manual type mode. Referring to FIG. 11, the mast/grapple may be controlled through the use of the Permissive Control System computer program, in a semi-automatic or pseudo-manual mode, by a user manually selecting SEMI-AUTOMATIC mode in step S30. A user then enters, via a computer 156 (FIG. 9) or other user interface, a pick-up coordinate and orientation for a reactor component in step S32. A user then manually verifies that the entered pick-up coordinate/orientation may be correct in step S34 before making a manual selection that causes the mast to automatically move to the entered pick-up coordinate in step S36. Example embodiments may optionally include a selection labeled "AUTO-RUN" (shown in step S36) on a user interface that may be manually selected to accomplish such automated movement of the mast.

Once the mast comes to rest above the entered pickup coordinate, the Permissive Control System verifies that the actual coordinate/orientation of the mast and grapple match the requested coordinate/orientation in step S49. The system determines if the proper grapple coordinate/orientation exists in step S51, and if it does not, the Permissive Control System then prohibits the grapple from being lowered in step S58 and an error signal may be provided for a user in step S58 to signify that the grapple coordinate or orientation may be incorrect. If the Permissive Control System determines that the grapple is at the proper coordinate or orientation, then the user is permitted to manually lower the grapple to the elevation of the component in step S38.

Once the grapple is lowered to the component, the user may be permitted to manually close the grapple in step S40 in order to pick-up the reactor component. At this point, the Permissive Control System may be RESET in step S42, as the system considers the component to have been picked-up in step S53. The user may be then permitted to manually raise the grapple in step S44.

While still in SEMI-AUTOMATIC MODE, the user then manually enters a destination (drop-off) location in step S46. The user may make a manual selection that allows the mast to automatically move to the drop-off destination in step S48. Example embodiments may optionally include a selection labeled "INCREMENT" (show in step S48) on a user interface that may be manually selected to accomplish such automated movement of the mast. Once the mast comes to rest above the destination coordinate, the Permissive Control System may then verify that the mast and grapple are at a coordinate and in an orientation that matches the requested/entered coordinate and orientation in step S55. The system determines if the proper coordinate/orientation exists in step S56, and if the mast/grapple is not in the proper coordinate or orientation, then the grapple is prohibited from being lowered in step S58 and an ERROR signal may be provided in step S58 to notify the user that the mast/grapple is not in the proper location or orientation for drop-off. If the mast/grapple is in the proper location/orientation, then a user is permitted to manually lower the grapple in step S50 for component drop-off. Once the grapple lowers the component to a resting elevation, the user may be permitted to manually open the grapple in step S52. The system may then RESET in step S57 as the Permissive Control System considers the component to have been dropped-off in step S59.

The user may then be permitted to manually raise the grapple in step S54, and enter a new pick-up coordinate for another component in step S32.

It should be recognized that many similarities between AUTOMATIC mode (FIG. 10) and SEMI-AUTOMATIC mode (FIG. 11) exist, with the difference lying in the fact that in SEMI-AUTOMATIC mode the user may input pick-up and drop-off coordinates and orientations while the process is ongoing, as opposed to entering the coordinates/orientations and sequencing of component movement upfront as a part of the AUTOMATIC mode process. SEMI-AUTOMATIC mode could be considered a pseudo-manual mode. In a truly MANUAL mode of operation, where a user may be given total control to move and rotate the mast and grapple, the Permissive Control System may be entirely disengaged, such that the system does not provide any error signals or prohibit the movement of the grapple or mast during the potential movement of components. In a truly MANUAL mode of operation, a system interface may provide a user indication to indicate that the Permissive Control System is not active, such that the user may move components generally at their own risk, with no guidance or verification from the Permissive Control System.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of permitting movement of a nuclear reactor component within a nuclear reactor, comprising:
    sensing a mast and grapple location;
    sensing a grapple orientation by configuring a cam, attached to a gimbal plate, such that the cam and the gimbal plate rotate in unison and in response to an angular rotation of the grapple while detecting a position of the cam using a plurality of switches positionable in proximity to the gimbal plate, the cam, the gimbal plate and the grapple configured to rotate bi-directionally and in a same direction with each other;
    calculating whether the sensed location and the sensed orientation, respectively, match a requested pick-up location and a requested pick-up orientation; and
    prohibiting lowering and grasping of the grapple, unless the sensed location and sensed orientation match the requested pick-up location and the requested pick-up orientation.

2. The method of claim 1, further comprising:
    inputting a plurality of requested pick-up locations and requested pick-up orientations, and the sequential order of the pick-up locations, using a user interface.

3. The method of claim 2, wherein the requested pick-up location and the requested pick-up orientation correspond to the pick-up locations and orientations of nuclear reactor components described on a nuclear reactor move-sheet.

4. The method of claim 1, further comprising:
    displaying the sensed location and the sensed orientation on a user interface screen.

5. A method of permitting movement of a nuclear reactor component within a nuclear reactor, comprising:
    sensing a mast and grapple location;
    sensing a grapple orientation by configuring a cam, attached to a gimbal plate, such that the cam and the gimbal plate rotate in unison and in response to an angular rotation of the grapple while detecting a position of the cam using a plurality of switches positionable in proximity to the gimbal plate, the cam, the gimbal plate and the grapple configured to rotate bi-directionally and in a same direction with each other;
    calculating whether the sensed location and the sensed orientation, respectively, match a requested drop-off location and a requested drop-off orientation;
    prohibiting the lowering and grasping of the grapple, unless the sensed location and the sensed orientation match the requested drop-off location and the requested drop-off orientation.

6. The method of claim 5, further comprising:
    inputting a plurality of requested pick-up locations and requested pick-up orientations, and the sequential order of the pick-up locations, using a user interface.

7. The method of claim 6, wherein the requested pick-up location and the requested pick-up orientation correspond to the pick-up locations and orientations of nuclear reactor components described on a nuclear reactor move-sheet.

8. The method of claim 5, further comprising:
    displaying the sensed location and the sensed orientation on a user interface screen.

* * * * *

UNITED STATES PATENT AND TRADEMARK OFFICE
CERTIFICATE OF CORRECTION

PATENT NO.         : 7,986,760 B2
APPLICATION NO.    : 11/984276
DATED              : July 26, 2011
INVENTOR(S)        : Johnson It is certified that error appears in the above-identified patent and that said Letters Patent is hereby corrected as shown below:

Title page, Item (73), Assignee, should read as follows:

-- GE-Hitachi Nuclear Energy Americas, LLC NC (US) --

Signed and Sealed this
Thirty-first Day of January, 2012

David J. Kappos
*Director of the United States Patent and Trademark Office*